(12) United States Patent
Graupner et al.

(10) Patent No.: US 8,141,090 B1
(45) Date of Patent: Mar. 20, 2012

(54) AUTOMATED MODEL-BASED PROVISIONING OF RESOURCES

(75) Inventors: Sven Graupner, Mountain View, CA (US); Akhil Sahai, Santa Clara, CA (US); Vijay Machiraju, Hyderabad (IN); James C. Pruyne, Naperville, IL (US); Keith Farkas, San Carlos, CA (US); Subramoniam N. Iyer, Newark, CA (US); Brian J. Watson, Chesapeake, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1233 days.

(21) Appl. No.: 11/789,411

(22) Filed: Apr. 24, 2007

(51) Int. Cl.
*G06F 9/46* (2006.01)
*G06F 9/455* (2006.01)
*G06F 15/173* (2006.01)

(52) U.S. Cl. ............ 718/104; 718/1; 718/105; 709/225; 709/226

(58) Field of Classification Search ............... 718/1, 104, 718/105; 709/225, 226
See application file for complete search history.

(56) References Cited

U.S. PATENT DOCUMENTS

| | | | |
|---|---|---|---|
| 4,949,254 A | 8/1990 | Shorter | |
| 6,915,347 B2 | 7/2005 | Hanko et al. | |
| 7,055,148 B2 * | 5/2006 | Marsh et al. | 717/172 |
| 7,080,378 B1 * | 7/2006 | Noland et al. | 718/104 |
| 7,310,673 B2 | 12/2007 | Zhu et al. | |
| 7,313,101 B2 | 12/2007 | Rhine et al. | |
| 7,577,722 B1 | 8/2009 | Khandekar et al. | |
| 7,644,162 B1 | 1/2010 | Zhu et al. | |
| 7,668,938 B1 * | 2/2010 | Phillips et al. | 709/220 |
| 7,676,578 B1 | 3/2010 | Zhu et al. | |
| 7,802,248 B2 | 9/2010 | Broquere et al. | |
| 7,823,152 B2 | 10/2010 | Bobroff et al. | |
| 7,827,557 B2 | 11/2010 | Zhu et al. | |
| 2002/0019860 A1 | 2/2002 | Lee et al. | |
| 2004/0054780 A1 * | 3/2004 | Romero | 709/226 |
| 2005/0210245 A1 | 9/2005 | Rolia et al. | |
| 2005/0234846 A1 * | 10/2005 | Davidson et al. | 707/1 |
| 2007/0006218 A1 | 1/2007 | Vinberg et al. | |
| 2007/0043860 A1 | 2/2007 | Pabari | |
| 2007/0214455 A1 | 9/2007 | Williams et al. | |
| 2007/0260723 A1 | 11/2007 | Cohen et al. | |
| 2008/0059214 A1 | 3/2008 | Vinberg et al. | |
| 2008/0201711 A1 * | 8/2008 | Amir Husain | 718/1 |
| 2009/0125902 A1 | 5/2009 | Ghosh et al. | |

OTHER PUBLICATIONS

Akhil Sahai, Sharad Singhal, Vijay Machiraju, Rajeev Joshi, "Automated Policy-Based Resource Construction in Utility Computing Environments," HP Laboratories Palo Alto, Aug. 21, 2003.*
Sahai, A. et al., "Automated Generation of Resource Configurations Through Policies"; 2004.
Singhal, S. et al., "Quartermaster-A Resource Utility System", IEEE/IFIP International Conf. on Integrated Management, May 2005.

(Continued)

*Primary Examiner* — Shew-Fen Lin
*Assistant Examiner* — Christy Lin

(57) ABSTRACT

Resources are provisioned in an automated manner for shared services in a resource-on-demand system. A model representing an observed state of resources in the resource-on-demand system allocated to the shared services and a model representing a desired state of the shared services are stored. At least one policy applicable to provisioning the resources for the shared services is determined. The policy and information from the models are applied to automatically provision the resources for satisfying the desired state of the shared services.

24 Claims, 12 Drawing Sheets

OTHER PUBLICATIONS

Zhu, X. et al., "Optimal Resource Assignment in Internet Data Centers", IEEE, Aug. 2001.

DMTF Common Information Model Standards, http://www.dmtf.org/standards/cim, downloaded Apr. 10, 2007.

Dunes Technologies, http://www.dunes.ch, downloaded Apr. 10, 2007.

Enigmatec, Execution Management System (EMS), http://www.enigmatec.net/Products/product/Execution_Management_System_(EMS), downloaded Apr. 10, 2007.

GoToMyPC, https://www.gotomypc.com/en_US/howItWorks.tmpl?, downloaded Apr. 19, 2007.

HP Consolidated Client Infrastructure, http://h71028.www7.hp.com/enterprise/cache/279997-0-0-225-121.aspx, downloaded Apr. 19, 2007.

HP ProLiant Essentials Virtualization Management Software, http://h18026.www1.hp.com/products/servers/management/rdp/index.html, downloaded Apr. 10, 2007.

HP ProLiant Essentials Rapid Deployment Pack, http://h18004.www1.hp.com/products/servers/management/rdp.html, downloaded Apr. 10, 2007.

IBM Autonomic Computing, http://www-03.ibm.com/autonomic, downloaded Apr. 19, 2007.

Microsoft System Center Virtual Machine Manager Product Overview, http://www.microsoft.com/systemcenter/scvmm/evaluation/overview/default.mspx, downloaded Apr. 10, 2007.

Microsoft Introducing System Center, http://www.microsoft.com/systemcenter/default.aspx, downloaded Apr. 19, 2007.

Moka 5, http://www.moka5.com, downloaded Apr. 19, 2007.

Open Grid Forum, http://www.ogf.org/, downloaded Apr. 19, 2007.

Symantec pcAnywhere, http://www.symantec.com/smb/products/overview.jsp?pcid=cli_mgmt&pvid=pca12, downloaded Apr. 19, 2007.

VMwware Desktop Infrastructure, http://www.vmware.com/solutions/desktop/vdi.html, downloaded Apr. 10, 2007.

VMwware Virtual Center, http://www.vmware.com/products/vi/vc/, downloaded Apr. 10, 2007.

* cited by examiner

600 instance of AllocatorDescriptor
{
ConsumerClass = "VirtualMachine"; ~~ 601
ResourceClass = "Server"; ~~ 602

ConsumerFilter = "isHosted == false"; ~~ 603
ResourceFilter = "isVMHost == true"; ~~ 604

Constraint Expr = ~~ 605
"resource.ProcessorType ==
 consumber.ProcessorType";

AssociationClass = "HostedOn"; ~~ 608
ResourceAssocProp = "Antecedent"; ~~ 609
ConsumerAssocProp = "Dependent"; ~~ 610
};

instance of AttributeMap
{
ConsumerCapExpr = "MemorySize"; ~~ 607
ResourceCapExpr = "MemorySize-512"; ~~ 606
};

FIG. 6

AUTOMATED MODEL-BASED PROVISIONING OF RESOURCES

RELATED APPLICATIONS

This application is related to U.S. patent application Ser. No. 11/789,409, entitled "Model-Based Provisioning of Resources", by Machiraju et al. and U.S. patent application Ser. No. 11/789,412, entitled "Automated Provisioning of Virtual Machines for a Virtual Machine Buffer Pool and Production Pool", by Sahai et al, both of which are filed concurrently with the present application and are incorporated by reference in their entireties.

BACKGROUND

Distributed computing services, utility-based data centers, and other types of resource-on-demand systems are becoming increasingly popular as a highly scalable means for utilizing computer resources to meet the computing demands of users.

Managing these resource-on-demand systems, including provisioning resources to satisfy user demand, is a difficult task that requires a significant amount of time and labor. Resource-on-demand systems typically pre-allocate and pre-install servers and storage resources for customer applications. In order to meet predetermined quality of service (QoS) requirements, however, servers are typically over-provisioned and under utilized.

Provisioning resources is an even more difficult task if the resources are being provisioned for shared services, where user demand may be less predictable. For example, a virtual desktop system is a type of shared services environment that provides remote desktop sessions for users. A remote desktop session includes a "desktop" with service elements hosted remotely from the user. The service elements may include processing, memory and storage as well as the software, including an operating system and applications, hosted remotely from the user. For example, the service elements may be located in a datacenter remote from the user or another environment where large amounts of computing resources can be physically maintained. The display and user input devices for interacting with the remote desktop are located with the user away from the computing resources, and the users and computing resources are connected using a network. For example, users may use thin clients to interact with their remote desktops. "Thin client" is a device that provides an interaction capability of a user with a desktop system. A thin client includes a small computer with peripherals such as monitor, keyboard, mouse and other interfaces. The thin client runs software that allows displaying and interacting with the actual desktop which runs remotely on a computer (or in a virtual machine on a computer) in a shared services environment. The desktop is connected to the thin client via a network connection through which the desktop's content is presented on the thin client's monitor, and through which a user's interactions are mediated back to the desktop such as mouse or keyboard interactions.

Allocating resources for remote desktops is difficult because of varying user requirements with respect to number and type of applications, processing power and amount of memory allocated to their desktops, graphics requirements etc. One allocation solution includes assigning a server to each desktop. However, if a server is assigned to each desktop, multiple users cannot share the same server, which limits efficiency.

Other conventional solutions for allocating resources for remote desktops include creating virtual machines to run desktops. Virtual machines are logical entities comprised of virtual machine software running on a server. Like the solution where a server is assigned to each desktop, when a virtual machine is assigned to each desktop, the virtual machines run applications as if the applications were running on the users' personal computers. Multiple virtual machine instances can run on the same server, which allows sharing of portions of the capacity of a physical machine among the virtual machines. Thus, virtual machines allow the sharing of servers among multiple desktops.

Typically, a virtual machine is assigned to each desktop, and typically a fixed number of virtual machines are hosted by statically, pre-assigned and pre-configured servers. Also, in many cases, these virtual desktops are also statically allocated to users. Thus, if a desktop has low utilization or if a user has logged off a desktop, then the resources assigned to that virtual machine remain idle and are not available for other demand. Also, if there is static binding between a virtual machine and a server hosting the virtual machine, if the server fails, then the user must wait for the server to be repaired or wait for a system administrator to manually assign a new server to host the virtual machine.

Manually assigning servers to virtual machines and the overall management of virtual machines for virtual desktop systems is also a difficult task. Current solutions require manual configuration of virtual machines to make the virtual machines available on hosting servers including images. An image is the entirety of installed software, including data and applications, as it would appear on a server's disk, from which the server would bootstrap and launch all its configured applications. Since virtual machines are connected to disks as well, content of those disks, which may be in the form of images, must be made available to the virtual machines, for example, in form of images, and the content is connected to a virtual machine during its bootstrap. Virtual machine management systems provide the necessary mechanisms to copy images and create, start and stop virtual machines, but those operations need to be initiated manually as needed during operation. Furthermore, as described above, assigning new virtual machines to servers is also done manually.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 6 illustrates an allocation description, according to an embodiment;

DETAILED DESCRIPTION

Figure 1:
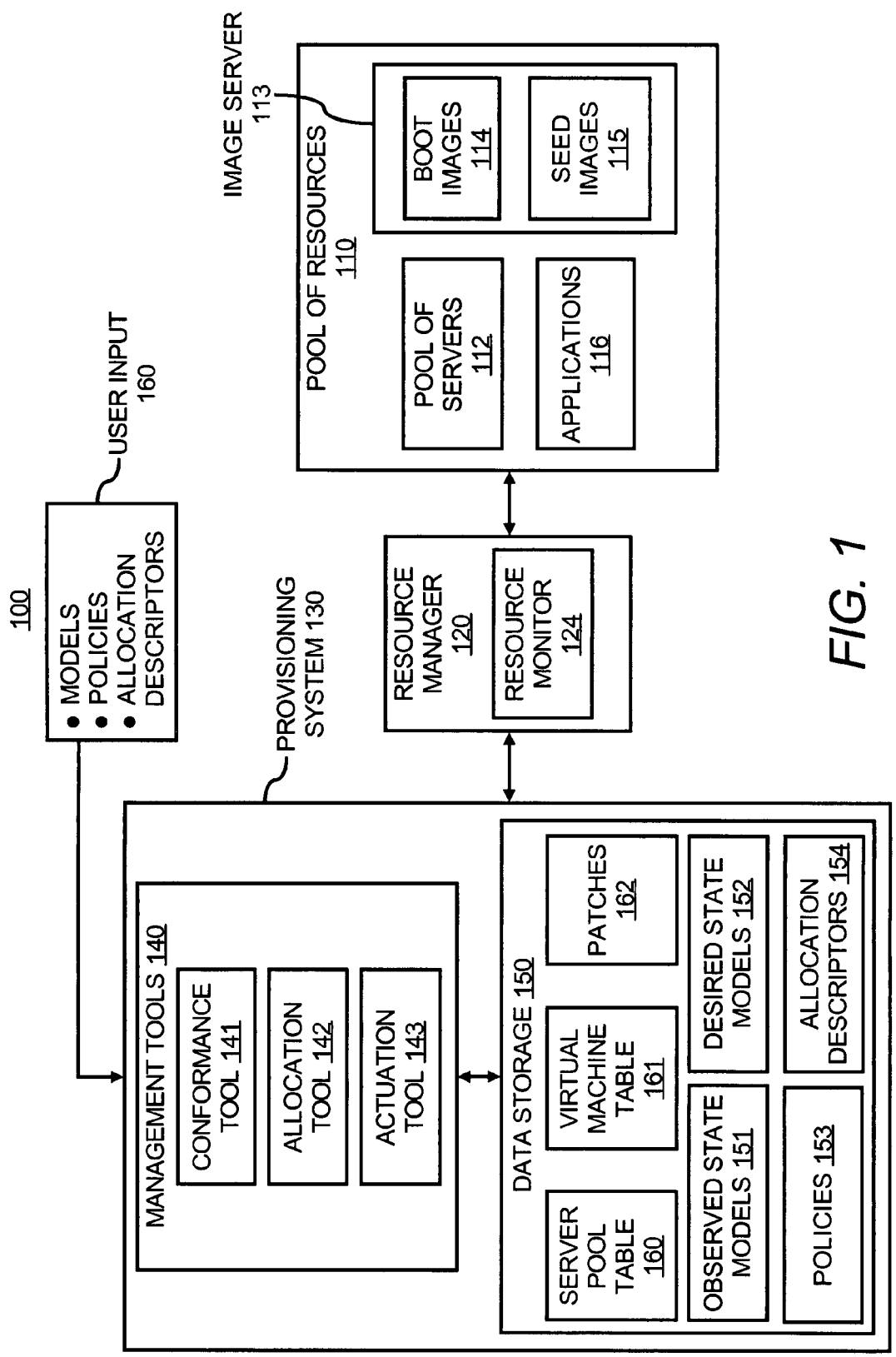
FIG. 1 illustrates a resource-on-demand system, according to an embodiment.

For simplicity and illustrative purposes, the principles of the embodiments are described. However, one of ordinary skill in the art would readily recognize that the same principles are equally applicable to, and can be implemented using variations of the described embodiments.

According to embodiments, an automated management system is operable to dynamically provision servers and virtual machines for shared services, such as a Virtual Desktop System (VDS). A server, also referred to as a physical server, is the computer system that is the platform for applications and/or virtual machines. The server includes hardware, such as processors, memory, disks, etc., and software, such as BIOS and an operating system, needed to run user applications and/or virtual machines. In one example, a server is provisioned to a user and applications needed by the user are loaded on the server. In another example, one or more virtual machines are created and executed on a server after the server is booted, and each virtual machine provides a desktop for a user in the VDS. The virtual machine runs the desktop with all the applications needed by the user.

The automated management system uses tools to automatically select and configure servers for running virtual machines and for automatically creating, running and assigning virtual machines to users. In one embodiment, images are used to automate configuration of servers and virtual machines.

Images include digital information stored on disks from which virtual machines or physical machines, such as servers, can be configured. The images may contain all necessary information, such as the operating system, data, applications, and all configuration information that is needed to allow a physical or a virtual machine to operate properly and satisfy user needs. For example, by copying and loading a bootable image on a server, the server can be automatically configured, remotely booted, and can provide a virtual environment for running virtual machines if the bootable image contains virtual machine software. Similarly a seed image, also referred to as a virtual machine image, may be distributed to a server running a virtual machine environment. A seed image may include all the applications and data for a particular class or type of desktop. A copy of the seed image is made on the server for each virtual machine the server will be hosting, and each virtual machine provides a desktop for a user when the virtual machine is started. A single seed image may be distributed to a server and copies of the seed image are created for each virtual machine to be hosted. A seed image may be provided to the server for each class or type of virtual machine to be created. For example, an analyst may use applications and data that an assistant may not need and vice versa. Thus, a seed image for an analyst class desktop and a seed image for an assistant class desktop may be distributed to the server if the server is going to host desktops for both types of users. One seed image may be provided to the server for each class.

The automated management system is also operable to automate the acquisition and release of servers from a pool of servers for hosting virtual machines. Temporarily unused servers can be used for other purposes or turned off for energy savings. The automated management system automates the lifecycle management, such as assignment and start/stop, of virtual machines on servers obtained from the pool. Also, the configuration and change management of software components for servers and virtual machines is performed faster and is made more manageable through use of the images. Images can be easily updated with patches to respond to configuration or application changes. Also, a pool of ready-to-use virtual machines can be maintained by re-using servers to host the virtual machines as the servers become idle.

Also, the system includes a model-based provisioning system that represents shared services in a model-based manner and defines a workflow including a sequence of actions performed by management tools in the provisioning system for provisioning resources for the services. The system being model-based refers to the fact that it operates on information that is represented in the system in the form of well-defined models. The model-based provisioning system makes provisioning decisions using modeled states of the shared services, and these provisioning decisions may be executed by an actuation tool performing the function described above, including the automated provisioning of servers and virtual machines. Furthermore, the model-based provisioning simplifies the process of introducing new classes of desktops and allows easier management of user-desktop relationships. A wide variety of desktop classes can be introduced and managed, where each class of desktop may require a different set of applications.

Conventional systems do not automate the provisioning of resources, especially for provisioning both servers and virtual machines. Typical systems require a significant amount of system administrator time to keep track of customer demand and to keep track of servers that are available or unavailable, because tracking resources is usually performed manually. Furthermore, no automated systems are available for provisioning both servers and virtual machines. For example, a virtual machine host, such as VMWare or ESX Server, may be manually loaded on a server to create a virtual machine environment on the server. Then, an operating system and applications are loaded corresponding to each virtual machine that will be run on the virtual machine host. The automated management system described in embodiments below is operable to automatically provision both servers and virtual machines based on model-based provisioning decisions.

The provisioning system according to embodiments described herein is generally described with respect to provisioning resources for a VDS. It will be apparent to one of ordinary skill in the art that the provisioning system is operable to provision resources for other types of shared services and for other types of user demands that may be described using the model-based approach described herein.

FIG. 1 illustrates a system 100 according to an embodiment for providing computer resources on demand. The system 100 includes a model-based provisioning system 130, a resource manager 120, and a pool of resources 110.

The pool of resources 110 includes resources allocated to user demand. The pool of resources 110 may include any type of resource available on servers or clusters of servers or racks of bladed servers that are to be shared by applications, such as processors, memory, disk storage, network slots, etc. The resources may be heterogeneous. For example, the pool of resources 110 may include different types of processors, and different resources may have varying capacities, such as different CPU speeds for different processors. The pool of resources 110 also includes software, such as operating systems and user applications. Heterogeneous resources may include different types of connection protocols, such as Remote Desktop Protocol (RDP), Remote Graphics System (RGS) or a streaming application, used to connect a user's computer or client device to remote resources provisioned for the user's computing demand.

As shown in FIG. 1, the pool of resources 110 includes a pool of servers 112 and an image server 113. The pool of servers 112 includes multiple servers that are operable to be used and reused for user demand including shared services. In particular, the provisioning system 130 is operable to use and then release servers to the pool as servers are needed or not needed to accommodate user demand. Also virtual machines include virtual machines that are created, started, stopped and removed from servers as needed to accommodate user demand. Creating and starting a virtual machine for example includes loading and running a virtual machine environment, e.g., a virtual machine host, on a server, copying an image of a virtual machine to the server and starting the virtual machine from the image in the virtual machine environment. Stopping and removing a virtual machine includes stopping the virtual machine from running, for example, after a user logs off the virtual machine and removing the image from the server. Starting and stopping the virtual machine may be performed by the virtual machine host running on the server.

The image server 113 is operable to store and provision images for servers and virtual machines. For example, the image server 113 includes a data repository storing boot images 114 and seed images 115. The boot images 114 include the software needed to boot the server and software providing a virtual machine environment on the server where virtual machines can be created, started, stopped and removed. For example, the boot images 114, in addition to including software allowing servers to be remotely booted, include virtual machine hosts providing the virtual machine environments. Examples of virtual machine hosts include VMWare, Virtual Server, Xen, etc. User applications, such as word processors, spreadsheets, email and contact management programs, etc., can be loaded in the virtual machine environment. When a server from the pool of servers requests a boot image, the image server 113 creates copies of the boot images 114 and sends the copies to the servers selected from the pool of servers 112.

The seed images 115 include software, such as operating systems and applications that will run in the virtual machines. When requested, the image server 113 creates copies of virtual machine images and sends the images onto the requesting servers where they are stored as seed images. When a virtual machine on those servers should be created, a local copy of a seed image is made on that server that is then used for creating a virtual machine on that server. The virtual machines are logical entities that may utilize a portion of the capacity of one or more servers. Each virtual machine is characterized by its demand. VDS demand is the demand created by remote desktop sessions of users. A virtual machine may be created for each desktop in the VDS. The virtual machine is sized to support the demand of the desktop. A virtual machine typically includes an operating system and user applications. Multiple virtual machines may run on a single server depending on the server capacity and the virtual machine demand.

The image server 113 stores the boot images 114 and the seed images 115, creates copies of the images as needed and sends the images on the servers from the pool of servers 112. The image server also updates boot images 114 and the seed images 115. For example, a remote system may connect to the image server 113 to send updated images with new software to the image server 113.

Applications 116 are also shown in the pool of resources 110. The applications include user applications, such as word processors, spreadsheets, email and contact management programs, etc. One or more of the applications 116 may be loaded on servers to provide a desktop. However, images, such as the seed images 115 include the applications for a desktop, and these images may be loaded on a server instead of loading applications individually.

The system 100 also includes the model-based provisioning system 130. The provisioning system 130 includes management tools 140 and data storage 150. The management tools 140, for example, are software tools for provisioning resources in the pool of resources 110. The management tools 140 use models stored in the data storage 150, which represent shared services or other types of user requests for resources and provisioned resources, to allocate resources to accommodate user demand.

In one embodiment, the system 100 provisions resources for shared services, and the provisioning system 130 is responsible for managing and provisioning resources for the shared services. The shared services may be characterized by centralized operation of several instances of an IT service, whereby resources are shared between those instances. Examples of shared services include infrastructure shared services and application-level shared services. Infrastructure shared services, such as server or storage utilities, are the most basic shared services where physical or virtual infrastructure resources are dynamically provisioned to applications that need them. Application-level shared services include sets of applications or application containers configured and provisioned dynamically to run end-user applications and business processes.

The VDS, described in more detail below, is a shared services environment where different classes of "desktops" may be provisioned to accommodate different types of users. The modeling and provisioning examples described below are for providing desktops in a VDS. However, it will be apparent to one of ordinary skill in the art that the modeling and provisioning described in the embodiments herein are applicable to other types of shared services and for provisioning resources for demand created by other applications.

The models stored in the data storage 150 may be used to support a variety of shared services easily and consistently, and allow for rapid customization to accommodate arbitrary services. The data storage 150 may include two model repositories storing observed state models 151 and desired state models 152. The observed state models 151 and desired state models 152 generally represent, respectively, the observed state of resources and the desired state of resources for user demand. For example, the observed state of resources may include the state of resources currently allocated to desktops in a VDS, and the desired state may include details regarding the optimum number of desktops to be created and supported at all times.

The management tools 140 incrementally determine what differences exist between the observed state models 151 and the desired state models 152, and make changes in the system 100 to accomplish the service provisioning. The content of the models, how the states are compared, and the management tools 140 are described in more detail below.

The models 151 and 152 allow new shared services to be easily introduced and existing shared services to be easily modified. By creating a proper model for shared services, the provisioning system 130 can automatically provision resources for the shared services without requiring any new, custom code development. The models 151 and 152 may include information models comprised of structured information, which in this case include information for managing systems and applications. The models may be structured so that humans or software can create, modify, use, and delete such information easily.

Information models may use a known schema, such as a meta-model. One example of a meta-model that may be used for the models 151 and 152 is the Common Information Model Schema (CIM Schema) from the Distributed Management Task Force (DMTF). The information model uses the CIM Schema as the meta-model for representing information models. If the CIM Schema is used to represent the information models, the management tools 140 support information models that are conformant to CIM Schema. If certain information is natively available in a model that does not conform to CIM Schema, then a tool may be used to convert it into a model that conforms to CIM Schema.

The provisioning system 130 may maintain two distinct model domains comprised of the desired state models 152 and the observed state models 151. Each of these domains may be modeled using CIM, and many of the model elements, such as class definitions, may be shared across the two domains. However, how instances of these models are populated and updated is completely different in the two domains. The desired state models 152 contain the descriptions of the service and the goals for provisioning the service. These descriptions and goals may be set by an operator and received in the user input 160. The desired state models 150 provide the input for various management tools which perform the provisioning process.

The observed state domain represents a current state of the shared services environment. This may include resources currently allocated to the shared service, utilization of the resources, and other information about resources currently provisioned for the service. The observed state models 151 are populated with these values representing a current state of the shared services environment. A resource monitor 124 in a resource manager 124 may determine which resources are allocated to the shared services and resource utilizations, and provide these values to the provisioning system 130 for populating an observed state model for the shared services. The desired state may be set by an operator or an entity external to the provisioning system 130. The observed state may be discovered and changed indirectly by making changes to the real environment, which includes the pool of resources 110. Together, the two domains comprised of the observed state models 151 and the desired state models 152 comprise the inputs to management tools 140.

Figure 2:
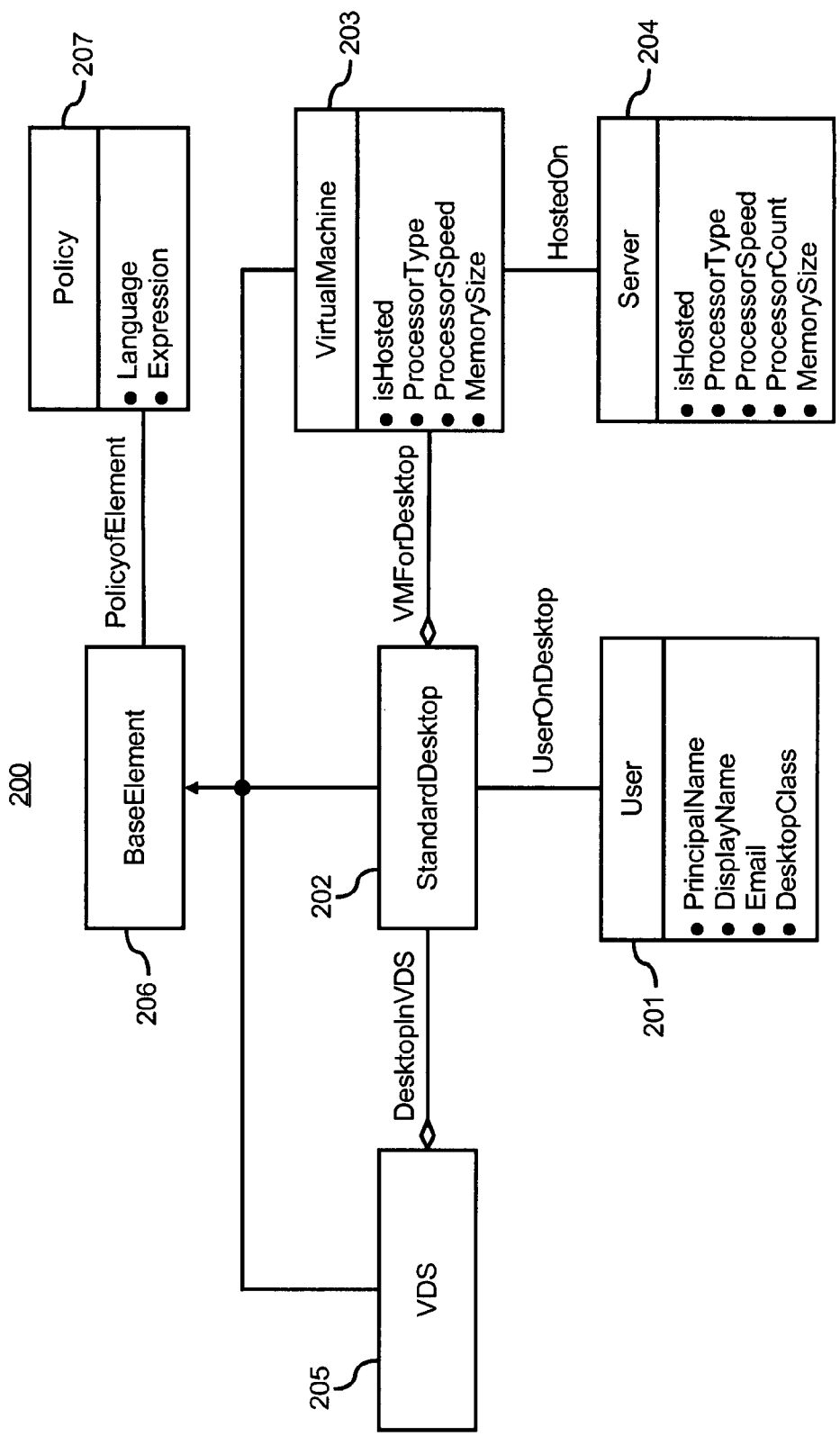
FIG. 2 illustrates classes in a desired state model, according to an embodiment.

Initial tasks that must be performed to automate provisioning for shared services are to define the models in the two domains. FIG. 2 shows a portion of a desired state model 200 for VDS. The desired state model 200 represents entities that are essential to support the information needs of the provisioning system 130 for provisioning resources to satisfy service requirements. Thus, the desired state model 200 for VDS includes structures for describing service elements, such as physical machines, virtual machines, desktop classes, etc.

For example, the desired state model 200 for the VDS may specify descriptions of the servers and virtual machines desired for desktops. To keep track of the number and types of desktops currently in use, the provisioning system 130 requires information pertaining to users that are currently logged into the system. All of these elements may also be represented in the desired state model 200 for VDS. The exact structure of the model is dependent on the service and on the needs of the tools that make up the provisioning system.

In the example shown in FIG. 2, the desired state model 200 defines five classes: a user class 201 which represents a type of user who may make use of desktops; a StandardDesktop class 202 which corresponds to a class of desktops being provided as part of VDS; a VirtualMachine class 203 which represents a virtual machine that is running to support one or more desktops, a Server class 204 which represents a physical server that may host a virtual machine or provide compute facilities to other services; and a VDS class 205. The VDS class 205 defines an aggregation of all the desktops running on resources from the pool of resources 110, and represents a container element for all other entities that are part of the VDS deployment. All of the classes 201-205 inherit characteristics from a common Base Element 206 to which an instance of a Policy class 207 can be attached.

Note that the desired state model 200 provides at least part of a workflow and system requirements. The workflow includes a sequence of actions to be performed to provision resources for the shared services, which is VDS in this example. The actions in the workflow may be performed by the management tools 140 as described in detail below. The workflow in the desired state model 200 includes allocating a server with the specified server attributes, and deploying a virtual machine on the server to run desktops in the StandardDesktop class 202.

A corresponding observed state model for the desired state model 200 may include all the service elements needed to provide the service. For example, the observed state model may include an inventory including a number of servers allocated and unallocated, virtual machines allocated to the shared services, number of desktops deployed for each class, etc. The number of allocated service elements and attributes for the service elements may be values provided in the observed state model. This information is used to determine whether the observed state conforms to the desired state for the shared service. For example, based on the observed state, the management tools 140 may determine whether the number of desktops deployed satisfies the desired state or whether the number and type of servers allocated to the shared services satisfies the desired state.

Model schemas for the desired state model 200 and a corresponding observed state model may be created by an administrator and stored in the data storage 150. Then, an operator/user or the system may populate the models. For example, the desired state model may be populated by an operator and the observed state model may be populated with values that are observed or measured. The observed state model may be populated using information provided by monitoring and management tools that are deployed in the managed environment. For example, the resource manager 120, including the resource monitor 124, shown in FIG. 1, may monitor resources and determine values to populate the desired state model 200.

Each management and monitoring tool may be responsible for generating instances of one or more of the model classes and relationships. These instances may then be combined by another tool for use by the provisioning system 130. For example, instances of the Server class 204 may be obtained from a network discovery tool, while instances of the VirtualMachine class 203 may be obtained from a virtualization management layer. For example, for the VirtualMachine class 203, the ProcessorType, ProcessorSpeed, and MemorySize are AMD, 2 GHz, and 2 GB because these are the attributes of the resources running the virtual machine, which may be determined by the resource monitor 124.

The desired state model 200 is a hierarchal model. For example, the bottom of the hierarchy is the Server class 204.

The VirtualMachine class 203 is the next level of the hierarchy and the desktop classes 201, 202 and 205 are in the next highest level.

Policies are applied to a specified level of a hierarchy in the desired state model. For example, an instance of the Policy class 207 associated with the StandardDesktop class 202 is applied to that level of the hierarchy. However, the provisioning system may modify or allocate resources for lower levels of the hierarchy to satisfy the policy. For example, if a policy requires a minimum number of StandardDesktops be deployed at all times, then more virtual machines may be created to support more StandardDesktops if the number deployed falls below the specified minimum. Policies may be provided by a user, for example, in the user input 160. Policies are constraints on provisioning resources. Policies may be specified in desired state models or separately. For example, a constraint may be specified in an allocation description or may be specified separately. Policies may be stored in the data storage 150. For example, FIG. 1 shows policies 153 stored in the data storage 150.

Figure 3:
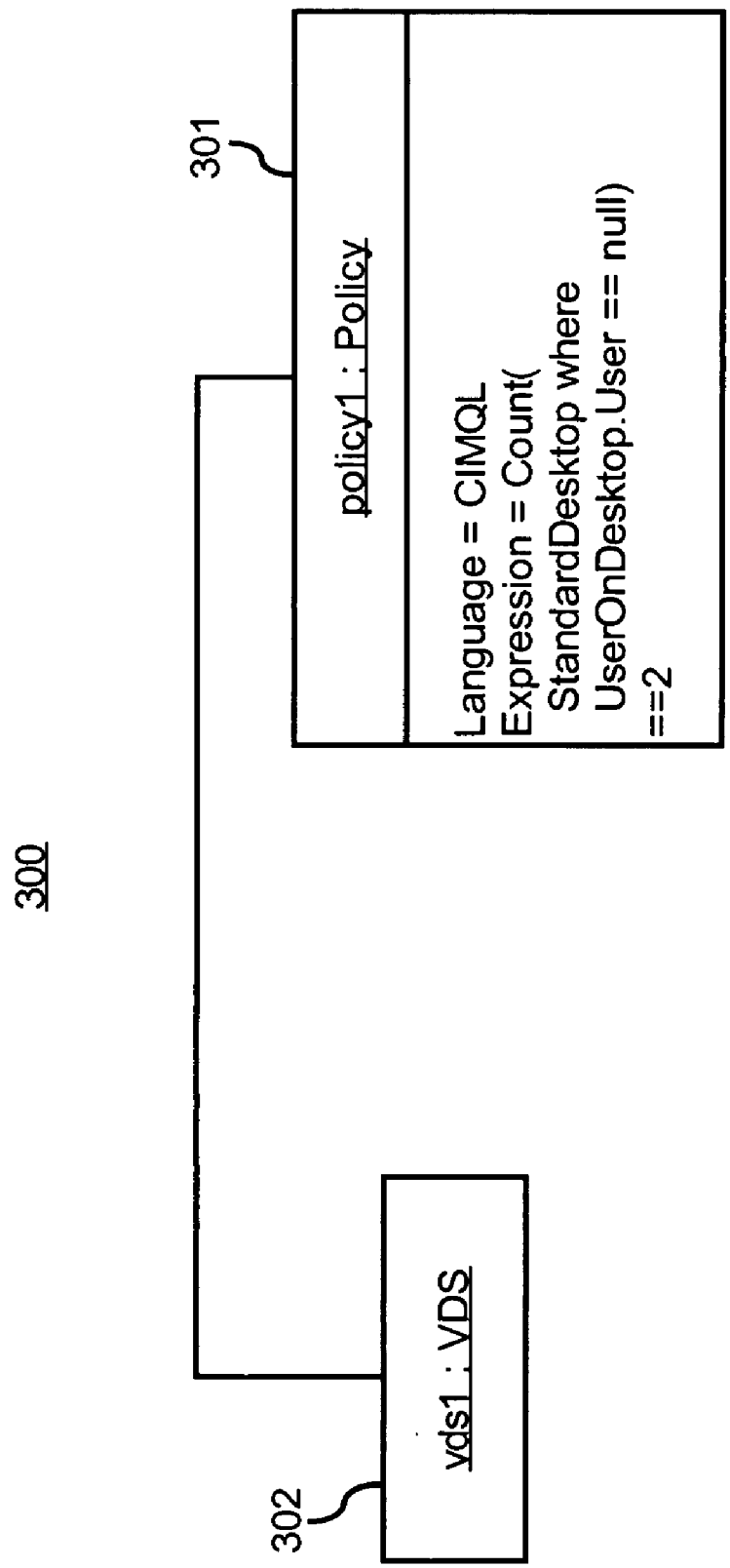
FIG. 3 illustrates an instance of a policy in a desired state model, according to an embodiment.

FIG. 3 shows a desired state model 300 for the VDS with an instance of the Policy class 207 shown in FIG. 2. The desired state model 300 may be provided by an administrator/operator, for example, in the user input 160 shown in FIG. 1. The model 300 is populated with values also provided by the user and stored in the data storage 150 as one of the desired state models 152. The model 300 includes a policy object 301 that applies to the VDS class 205 in the desired state model 200 for the VDS.

The policy object 301 is instantiated to describe the desired state of the overall shared services which is represented by the instance vds 1 of the VDS class 205. The policy shown in this example states that the operator desires to maintain two idle standard desktops at all times in the VDS. Note that the policy assertion is in terms of the desktops which are service-level entities, and no concern is needed for the lower level portions of the model such as servers or virtual machines. Expanding this higher-level information into actionable desired state is one of the tasks performed by the management tools 140 of the provisioning system 130. This means that an operator can specify policy using familiar entities, and leave it to the provisioning system 130 to determine how these service entities are mapped to the lower levels.

The desired state model 300 is an example of what an operator might specify for a VDS service. For a different shared service, the definition of a desired state model could be very different. For example, the structure of the service as well as how desired service level policies are expressed could be different. Also, the policy may be defined using an entirely different syntax of the provisioning system supporting it.

Referring again to FIG. 1, the provisioning system 130 includes management tools 140. Each tool is presented with a uniform view of both the desired state and observed state of the service through the models. Because the representation is consistent, each tool is able to examine the portion of the model it is responsible for, and determine where the observed state is inconsistent with the desired state. A tool then takes actions to try to make the two states consistent. For example, if the service requirements as specified in the desire state model are not satisfied, changes to the desired state and/or actions on the real environment, which then get reflected in the observed state, are performed. The management tools 140 may be coordinated using a workflow, which is a predetermined sequence for invoking each tool to perform the automated provisioning of resources.

Some examples of the management tools 140 are also shown in FIG. 1. The management tools 140 may include a conformance tool 141, an allocation tool 142 and an actuation tool 143.

Using the information in the observed state model and the desired state model, the conformance tool 141 determines whether the service requirements are being satisfied and takes actions if the requirements are not satisfied. For example, the conformance tool 141 verifies whether higher-level policy statements for a service are being conformed to in the environment. This may include identifying policies in the desired state model and determining whether constraints in the policies are satisfied. If there are deviations, then appropriate actions are taken to make the two states consistent.

Figure 4:
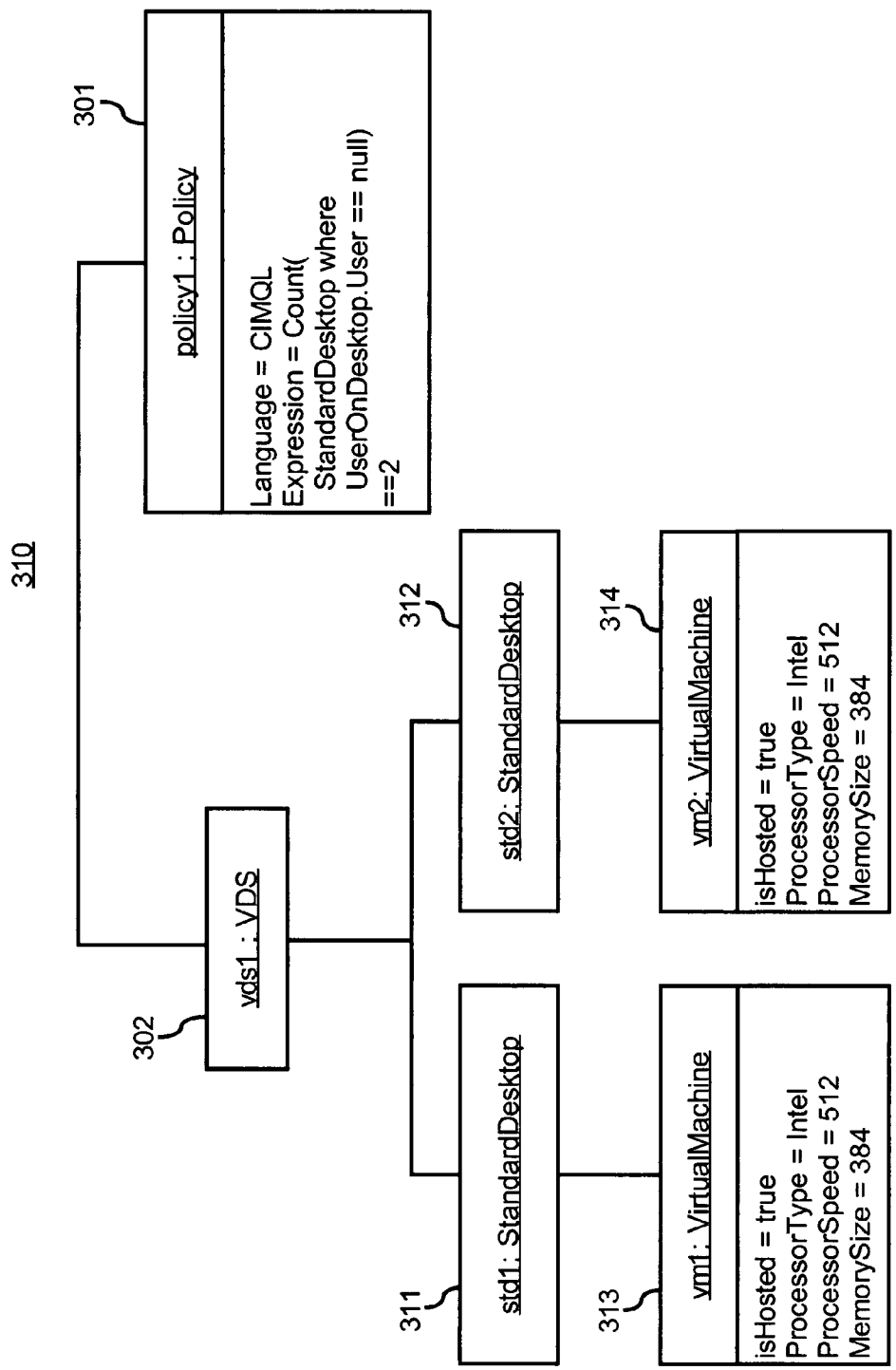
FIG. 4 illustrates a desired state model modified by a conformance tool, according to an embodiment.

To illustrate actions performed by the conformance tool 141, FIGS. 2 and 3 show the initial desired state model of the VDS, and FIG. 4 shows the revised desired state model 310, which is revised by the conformance tool 141 to conform the desired state with the observed state. As described above and shown in FIG. 3, the policy object 301 includes an instance of the Policy class 207 shown in FIG. 1. The policy requires two standard desktops deployed in the VDS on which no user is logged in, as indicated by the null value for the association UserOnDesktop. For example, these desktops form a pool of desktops that may be quickly deployed to users if needed.

Assume the conformance tool 141 executes and determines that the observed state model reflects that all deployed standard desktops are in use. Thus, the desired state model is not satisfied, because two standard desktops deployed in the VDS on which no user is logged in are not used. In other words, the policy applicable to the VDS class is not satisfied. As a result of executing the conformance tool 141, the desired state model 200 is refined to the desired state model 310 shown in FIG. 4 so the policy can be satisfied.

The new desired state model 310 shown in FIG. 4 shows two new standard desktop instances, std1 and std2 shown as 311 and 312, which have been added to the desired state model 300. These instances are added to conform to the policy object 301 which states that there should be two standard desktops with no user associated. Each of these standard desktop instances 311 and 312 is additionally associated with a new virtual machine instance 313 and 314 respectively. These instances are created as a result of a policy on the standard desktop. This policy asserts that any standard desktop should be associated with one virtual machine, and that the virtual machine should have the property values, such as ProcessorType=Intel. Constraints in the policy are reflected in the property values shown in 313 and 314.

The allocation tool 142 matches entities that consume capacity, such as desktop users of the VDS with other entities which provide capacity, such as resources in the pool of resources 110. During provisioning, this matching may be performed one or more times for different definitions of users and resources. As an example, refer to the desired state model 200 shown in FIG. 2. The VirtualMachine class 203 is a typical example of a class for virtual machines, and shows the relationship between a virtual machine and a server capable of hosting the virtual machine. When a virtual machine is placed on a server that relationship is shown as an association called HostedOn. If the refined desired state model 310 from FIG. 4 is provided as input to the allocation tool 142, the output may be the revised desired state model 320 shown in FIG. 5.

The allocation tool 142 refined the desired state model by first adding Server instances 321 and 322. The Server instances 321 and 322 are guaranteed to have sufficient capacity to host the virtual machines 313 and 314. The allocation tool 142 compares its input desired state model with the current observed state model. Wherever there are users that need resources, the allocation tool 142 finds those resources. Wherever there are users that are no longer present in the desired state model, the system 100 de-allocates those resources and uses them for other needs.

Functions for solving the allocation problem have been very well studied, and can vary from simple bin-packing to more complex heuristics incorporating techniques such as linear programming and genetic algorithms. These functions are generic enough that they can be used to map an arbitrary set of users, such as a set of desktops to be deployed, to an arbitrary set of resource providers, such as a set of virtual machines. To match resources with demand, the functions may only need to know what to look for in the information models to determine which objects are users and which objects are resource providers. According to an embodiment, this is done by customizing the allocation tool 142 through an "allocation descriptor". Allocation descriptors 154 may be provided as part of the user input 160 and may be stored in the data storage 150. An allocation descriptor may be in the form of a CIM model. This model identifies the model entities corresponding to users and resources, the conditions under which they can be matched, and how that match is represented in the modeled environment.

FIG. 6 shows an example of an allocation descriptor model 600 corresponding to the classes in the model 200 shown in FIG. 2. The allocation descriptor model 600 specifies the model definitions for the users and resources which the allocation tool 1421 performs matching on. In this example, the user, also referred to as consumer, is an instance of the VirtualMachine class 203, and the resource is an instance of the Server class 204. This is shown as ConsumerClass 601 and ResourceClass 602. In addition to the class definitions, such as ConsumerClass 601 and ResourceClass 602 definitions, the model 600 may define filters which must be satisfied by the instances for them to be considered by the allocation tool 142 as entities requiring allocation in the case of users or capable of providing capacity in the case of resources. In the model 600, ConsumerFilter 603 and ResourceFilter 604 are shown. The ConsumerFilter 603 specifies that a VirtualMachine entity only requires allocation if its "is Hosted" property is false. Thus, a virtual machine is only allocated if it is hosted by a server in this example. ResourceFilter 604 specifies that a Server entity is only capable of hosting a virtual machine if its "is VMHost" property is true. By providing these filters, the number of (consumer, resource) pairs that the allocation tool 142 must consider is limited, which helps to reduce the time required during allocation.

Even after filtering, it may be necessary to compare attributes of the consumer and resource to insure that they are a compatible match. This is performed via constraint expressions. These are Boolean expressions which must be true if a match is to be performed. Attributes of the resource are specified using the "resource" pre-fix and attributes of the consumer are similarly specified using the "consumer" pre-fix, such as shown for the ConstrExpr 605. ConstrExpr 605 states that the processor type of the virtual machine and the server must have the same value.

In addition to satisfying the defined constraints, a consumer, such as a desktop user, can only be matched with a resource if the resource has sufficient capacity. For this, the capacity provided by the resource and the capacity used by a consumer in terms of the attributes on the model definition for these classes are defined. These values are given in an attribute map. The attribute map defines expressions corresponding to the amount of capacity the resources provide, such as the ResourceCapExpr 606, and the amount of capacity a consumer utilizes, such as the ConsumerCapExpr 607. The model 600 shows an attribute map for memory utilization. Note that the resource's capacity is reduced by a constant value, 512, which represents reserved capacity for the server which hosts the virtual machines.

The allocation description model may also specify how matches are written back into the model repository. As shown, this is accomplished using an association. For example, the definition of the association is given with the descriptor properties AssociationClass, ResourceAssociationProp and ConsumerAssociationProp, shown in 608-610. These specify for the allocation tool 142 what association type to create, and what the properties on that association are for the resource and consumer respectively. By creating this association, the allocation tool 142 is able to indicate, to further steps in the provisioning process, exactly what matches have been performed, and what therefore may need to be enacted to satisfy the desired state.

The actuation tool 143 performs actions for putting decisions made earlier in the provisioning process, for example by the conformance and allocation tools 141 and 142, into effect in the system 100. Because all of the decisions have been made and the configuration is stored, for example as a desired state model and an observed state model, actuation is simplified to be the changing of resources in the pool of resources 110.

According to an embodiment, the actuation tool 143 automatically provisions resources based on the decisions made by the conformance and allocation tools 141 and 142. This includes the configuration of servers to host the virtual machines and starting, stopping and removing virtual machines. Servers from the pool of servers 112 are used and released to the pool of servers 112 as needed to host virtual machines to provide desktops. The data storage 150 may include a server pool table 160 to keep track of the servers in the pool of servers 112 that are available and unavailable for allocation. Available servers are servers that may be idle or have capacity to support user demand. Servers that are unavailable may be currently allocated to user demand, such as running virtual machines for desktops, and cannot support additional requested demand or the servers may be nonfunctional. The server pool table 160, for example, includes an identification of each server, its status (e.g., available, unavailable), and attributes, such as processor types, amount of memory and disk space, available capacity, etc. Based on the information in the table 160, the actuation tool 143 can select servers to allocate for new desktops.

Also, virtual machines may be started and stopped on servers as needed to provide the desktops. The data storage 150 may include a virtual machine table 161 that keeps track of the virtual machines that are assigned and unassigned. The actuation tool 143 may select virtual machines to assign to users based on information in the table 161. The table 161 may include the status of virtual machines, such as assigned or unassigned, and other information, such as class (e.g., platinum, gold, silver, etc.) where each class may have different server requirements and different applications.

The data storage 150 may also store patches 162, which are updates to images stored in the image server 113 or new images. The actuation tool 143 initiates sending the patches 162 to the image server 113, for example, using Rapid Deployment Pack or another remote deployment system. The image server 113 may then distribute the new images on the servers when needed.

Figure 5:
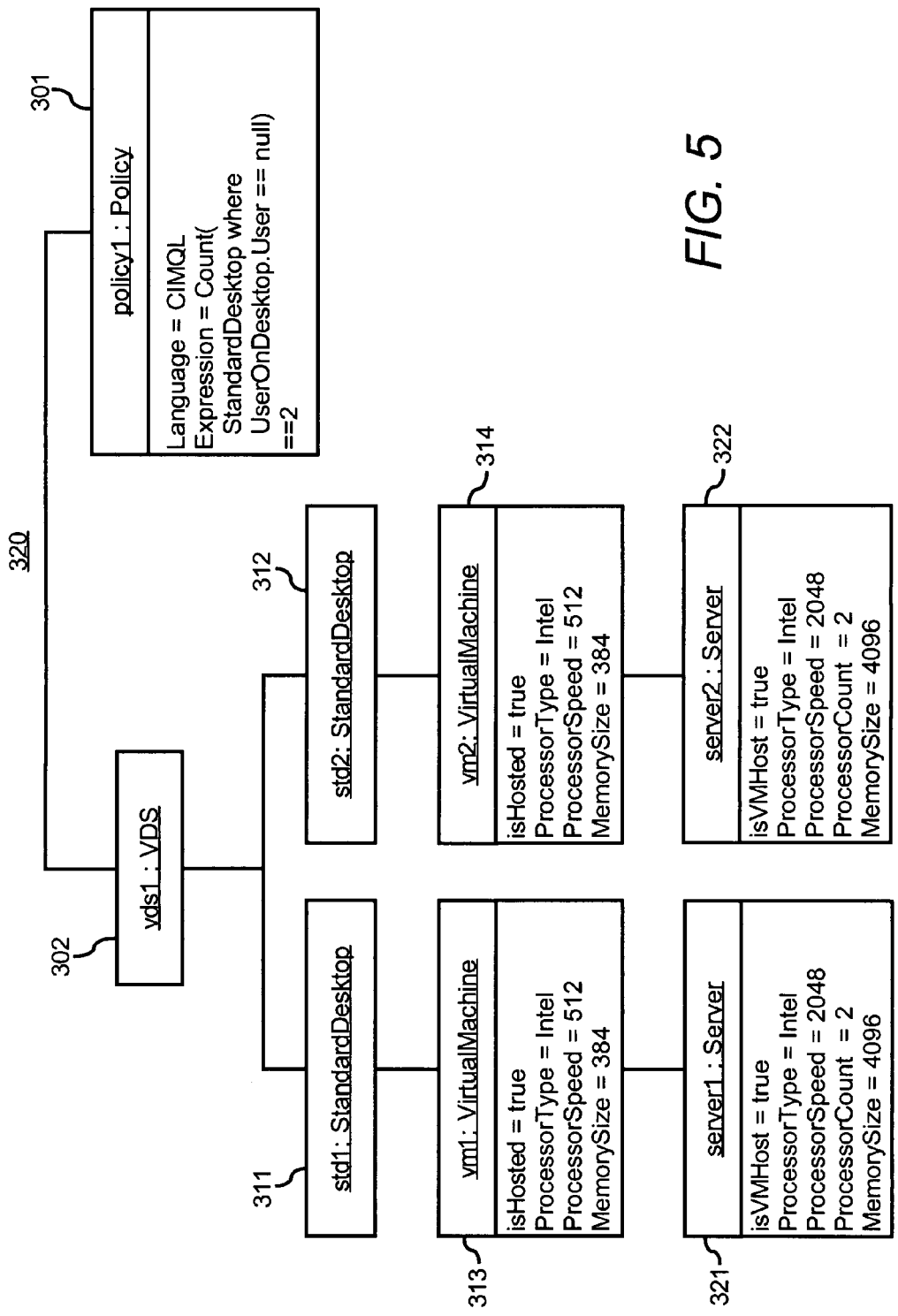
FIG. 5 illustrates a desired state model modified by an allocation tool, according to an embodiment.
Figure 7:
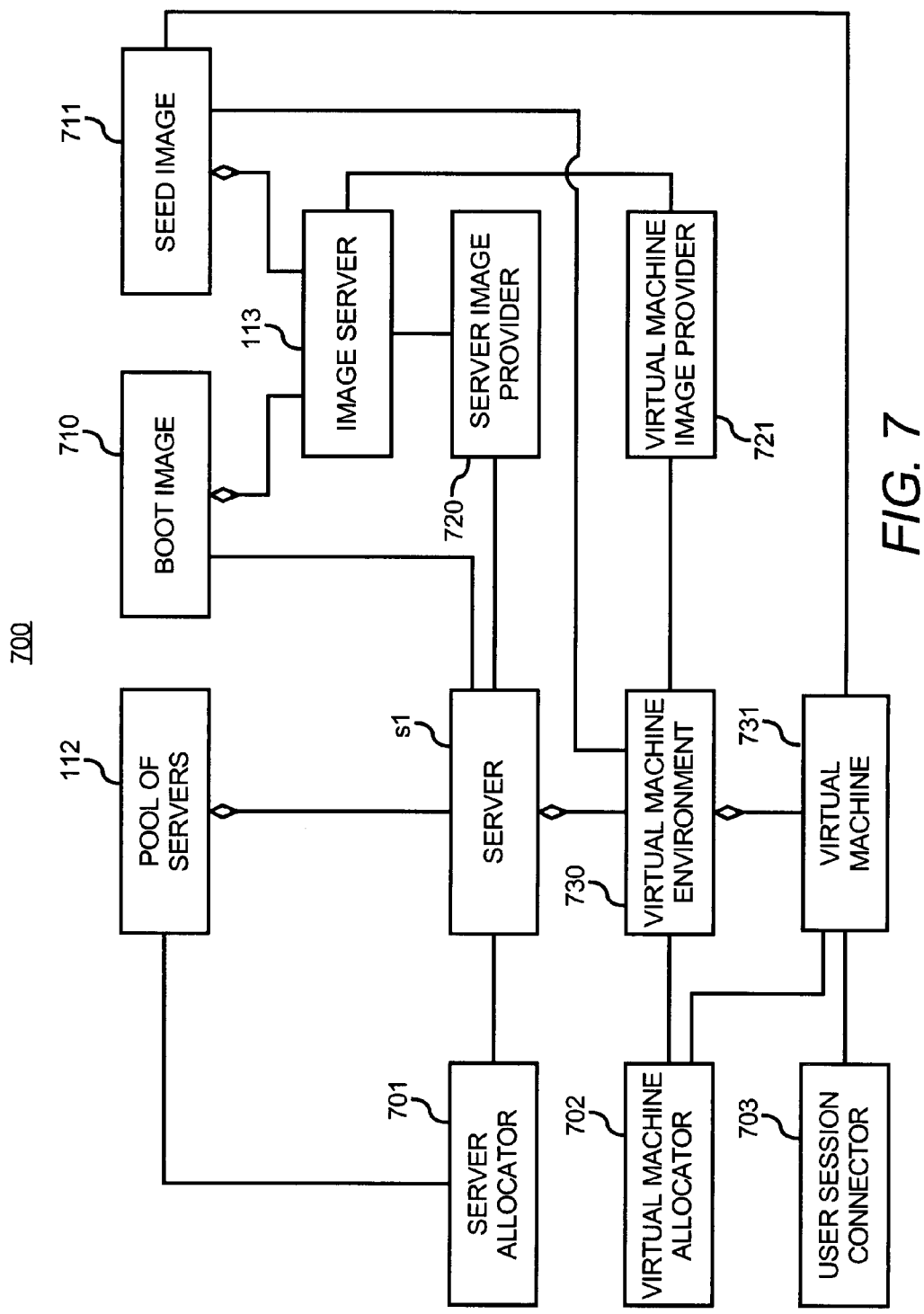
FIG. 7 illustrates components of an actuation tool, according to an embodiment.

Components of the actuation tool 143 are shown in FIG. 7. The components of the actuation tool 143 include the server allocator 701, virtual machine allocator 702, and the user session connector 703. The server allocator 701, based on policy, makes and executes a decision to allocate a server from the pool of servers 112. For example, the server allocator 701 receives decisions made by the allocation tool 142 matching user desktops with servers from the pool of servers 112. FIG. 5 shows matches of server1 and server2 with two standard desktop instances, std1 and std2, where the standard desktop is one class of desktops from a plurality of classes of desktops.

Referring again to FIG. 7, the server allocator 701 also initiates attaching boot images to servers, which contain a virtual machine environment, and boots servers bringing the virtual machine environment into existence. For example, the server allocator 701 instructs the image server 113 to distribute a boot image 710 from the boot images 114 to the physical server s1 from the pool of servers 112. The server s1 has the attributes shown under s1 in FIG. 5.

As shown in FIG. 7, servers, including the server s1, are from the pool of servers 112. Boot images are provided by a server image provider 720 and seed images are provided by a virtual machine image provider 721 and stored in the image server 113. The image server 113 is operable to distribute boot images, such as the boot image 710 shown in FIG. 7, to servers, and distribute seed images, such as the seed image 711, to servers that have been booted using the boot images and are executing the virtual machine environment.

After the server s1 shown in FIG. 7 receives the boot image 710, the boot image 710 is loaded onto the server s1. The server allocator 702 then boots the server s1, for example, remotely using conventional remote management software. The booted server s1 includes the virtual machine environment 730, which is a virtualization layer running on the server s1. The image server 113 distributes the seed image 711 to the server s1, which may include all the applications for the standard desktop class and an operating system.

The virtual machine allocator 702, based on policy, makes and executes decisions to create a number of virtual machines in a virtual machine environment such that the capacity of the server is not exceeded. Copies of the seed image are created for each instance of a virtual machine that is needed. For example, the virtual machine allocator 702 instructs the image server 113 to create a copy of the seed image 711 and distribute the image to the server s1. The virtual machine allocator 702 sends a message to the server s1 indicating the number of virtual machines to be created from the seed image 711. The server s1 makes a copy for each virtual machine to be created. The seed image and its copies are loaded in the virtual machine environment 730. For example, the virtual machine 731 is created using the seed image 710.

Virtual machines created on the servers in the virtual machine environments result in unassigned virtual machines that may be assigned to users as user login. VDS maintains a pool of unassigned virtual machines in order to avoid creation of virtual machines when requested from a user. When a user requests a desktop through login, the user session connector 703 chooses an unassigned virtual machine of the user's class from the pool of unassigned virtual machines. The user's request for a desktop subsequently is then directed and processed by this virtual machine logging the user in. After a virtual machine is assigned to a user and the user logs off the desktop, the virtual machine, including its image, is removed from the server. Thus, the virtual machine allocator 702 is operable to create, start, stop, and remove virtual machines.

Since virtual machines are destroyed after use, another process is simultaneously being performed to maintain the balance at any time of a sufficient number of unassigned virtual machines. Thus, virtual machines are continuously being created, for example, to satisfy a policy specifying that a predetermined number of unassigned virtual machines must be running at any given time. The policy may also specify the type of virtual machine, such as a virtual machine for a particular desktop class. The process of removing and creating unassigned virtual machines is continually being performed by the virtual machine allocator 702.

For example, the virtual machine allocator 702 continuously scans all virtual machine environments observing the ratio between unassigned and assigned virtual machines. If this ratio falls below a threshold, which is specified by a policy, new unassigned virtual machines are started until the ratio reaches a desired balance. If the ratio appears above a threshold, which is specified by a policy, the virtual machine allocator 702 may acquire more servers from the pool of servers 112 by contacting the server allocator 701. The decision to acquire more servers may take current and past utilization into account.

If no assigned virtual machines are in a virtual machine environment, the server may be released back to the pool of servers 112. This decision may also take current and past utilization into account.

The user session connector 703, based on policy, makes and executes decisions to connect a user's request for a desktop to one of the existing unassigned virtual machines in one of the virtual environments on one of the physical servers. This turns the virtual machine into an assigned virtual machine. For example, the user session connector 703 assigns the virtual machine 731 to a user predetermined to be given desktops in the standard desktop class. When, the user logs off the virtual machine 731, the user session connector 703 changes the status of the virtual machine to unassigned.

As described above, virtual machines are removed from servers when they are not used, such as when a user logs off. For example, the virtual machine allocator 702 determines that a user has logged off, for example, from information received from the user session connector 703 and/or information about status of virtual machines in the virtual machine table 161 shown in FIG. 1. The virtual machine is shut down and removed along with its virtual machine image on the server.

The server allocator 702 may release servers back to the pool of servers 112 when they have available capacity, and there status is changed to available. Then, the servers may be reused for other desktops. For example, the server allocator 702 can make the decision, if sufficient servers are available in the server pool 112, to shut down the server and power off to achieve energy savings. If sufficient servers are available in the server pool 112, the server may be repurposed by shutting it down, loading a new bootable image including a new application that might be requested and rebooting the server. Alternatively, the server is kept operational with the virtual machine environment to accommodate later requests for user desktops The system 100 shown in FIG. 1 includes a resource manager 120. The resource manager 120 includes a resource monitor 124. The resource monitor 124 may be operable to identify attributes of allocated and available resources in the pool of resources 110 and may also measure utilizations. The attributes and measurements may be used to populate observed state models.

The flexibility of the provisioning system 130 results from two properties. First, the management tools 140 support a uniform abstraction, and thus can be composed into a workflow without the need to write any code. Second, the inputs to such a workflow and the tools from which it is comprised are models. These models allow behavior of the workflow to be easily defined. The workflow may include the order of actions performed by each management tool to provision resources for a shared service. To illustrate these two properties, the running example of provisioning resources for a VDS is used.

For example, the system operator wishes to deploy a second type of desktop that, like the standard desktop, runs within a virtual machine. This new desktop type is called premium and offers twice the computing power, e.g., twice the CPU speed, of the standard desktop and must be hosted by a different set of servers. Also, the system operator wishes to deploy a third type of desktop, called platinum. The platinum desktop, unlike the other two types of desktops, does not run within a virtual machine. Rather, it runs directly on top of a physical server. That is, the platinum desktop does not require a virtualization layer.

To support the first case, the system operator need only redefine the inputs to the provisioning workflow that was described above. To do this, the operator performs just two steps. First, the operator augments the existing desired state model shown in FIG. 2 with a new class representing the premium desktop. This class has the same associations as the standard desktop class. Second, the operator defines a new instance of the policy class shown in FIG. 3 for the premium desktop and captures within it the desired state for this new desktop type. For example, the operator may specify that there should be 4 premium desktops always available for users to login. These steps are all that are necessary to introduce the new type of desktop. The management tools 140 read these models, and maintain the pool of desired premium desktops just as they do for the standard desktops.

Figure 8:
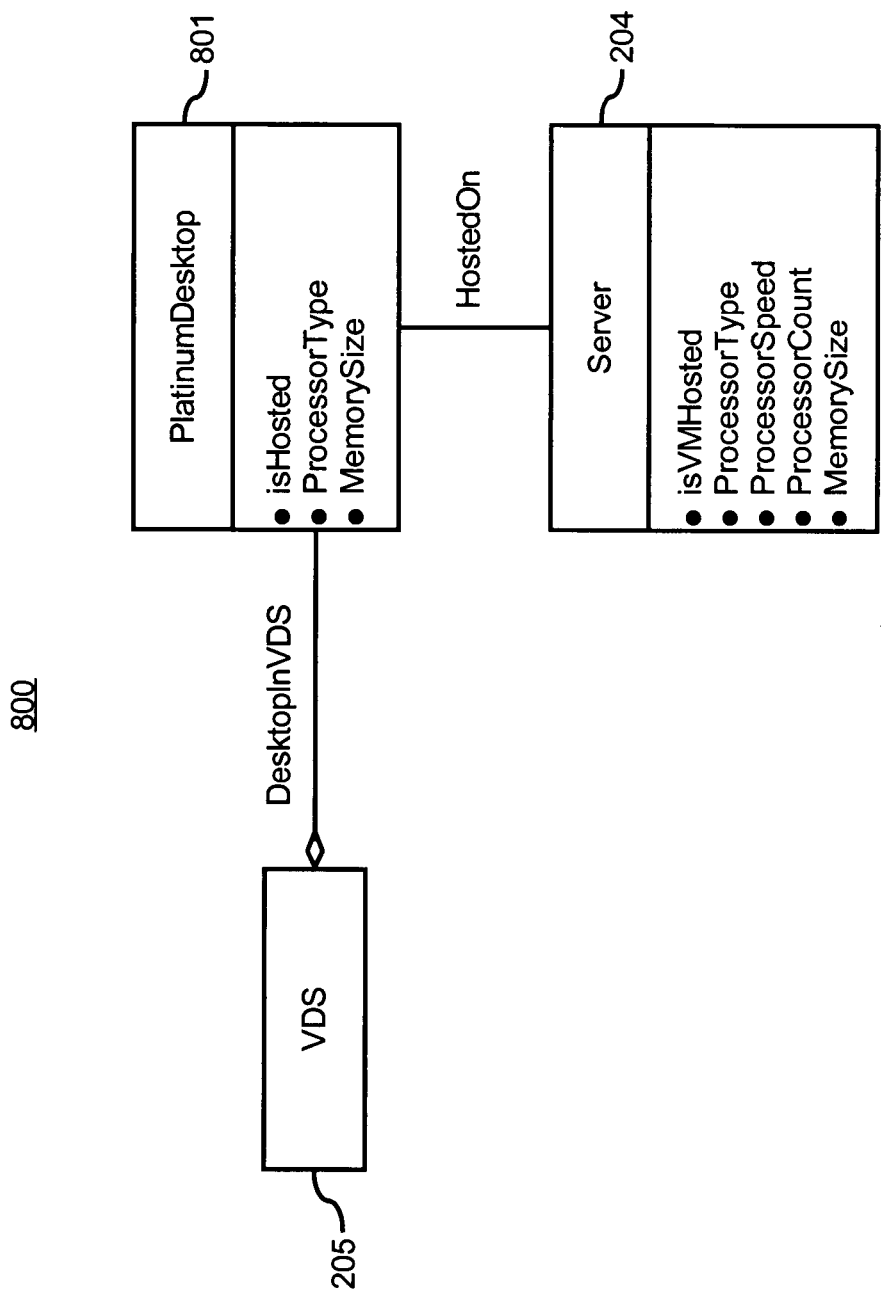
FIG. 8 illustrates a new class added to a desired state model, according to an embodiment.

To support the second case in which the third type of desktop is run directly on top of the physical server, the operator perform similar steps but also changes the provisioning workflow. First, like with the premium desktop, the operator modifies the desired state model to include another desktop class called platinum. However, the operator creates an association between this class to the physical server without the virtual machine in the middle. FIG. 8 shows a new PlatinumDesktop class 801. The PlatinumDesktop class 801 is associated with the Sever class 204 and the VDS class 205. Note that a platinum desktop is hosted on an instance of the Server class 205, and the platinum desktop is in the VDS class 205. Second, the operator may define a desired state policy for the platinum class, which may specify the number of idle desktops that exist in the computing environment. Third, the operator creates a new allocation descriptor that specifies platinum desktops should be allocated to physical servers not virtual machines. Finally, the operator integrates into the workflow a tool that can boot an operating system on a system, such as RDP. This tool is used whenever a platinum desktop is provisioned. When a premium or standard desktop is provisioned, a different tool is, such as a virtual machine management tool.

Figure 9:
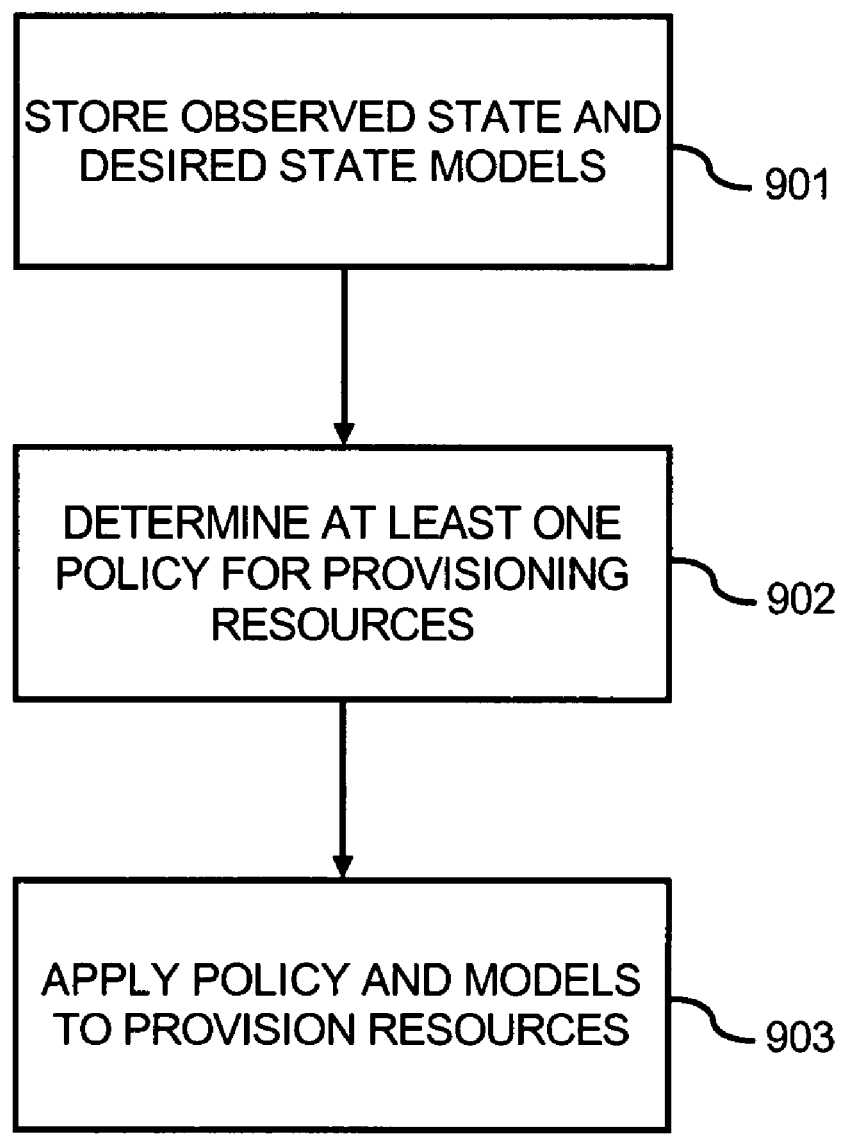
FIG. 9 illustrates a flow chart of a method for provisioning resources, according to an embodiment.

FIG. 9 illustrates a flow chart of a method 900 for provisioning resources for shared services in a resource-on-demand system. The method 800 is described with respect to one or more of FIGS. 1-8 by way of example and not limitation. The method 900 and other methods described below may be performed in other systems and may be used to provision resources for a service other than a VDS.

At step 901, models representing an observed state of resources allocated to the shared services and representing a desired state of the shared services are stored. For example, observed state models 151 and desired state models 152, shown in FIG. 1, may include an observed state model and a desired state model for a VDS.

At step 902, at least one policy applicable to provisioning resources for the shared services is determined. This may include identifying a policy specified in the desired state model for VDS. FIG. 2 shows a policy class 207 for the desired state model 200, and FIG. 3 shows an instance of the policy that is identified by the conformance tool 141 for provisioning resources. Policies may also be provided as constraints in allocation descriptors, and these policies must be satisfied when allocating resources.

At step 903, the policies and information from the models are applied to automatically provision resources to satisfy the desired state of the shared service. This may include one or more of identifying that there is a non-conformance between the desired state model and the observed state model, and modifying the desired state model and/or allocating resources to satisfy user demand. Provisioning may also include automatically allocating the resources to satisfy the user demand, such as described with respect to the allocation tool 142 and the actuation tool 143 shown in FIG. 1.

Figure 10:
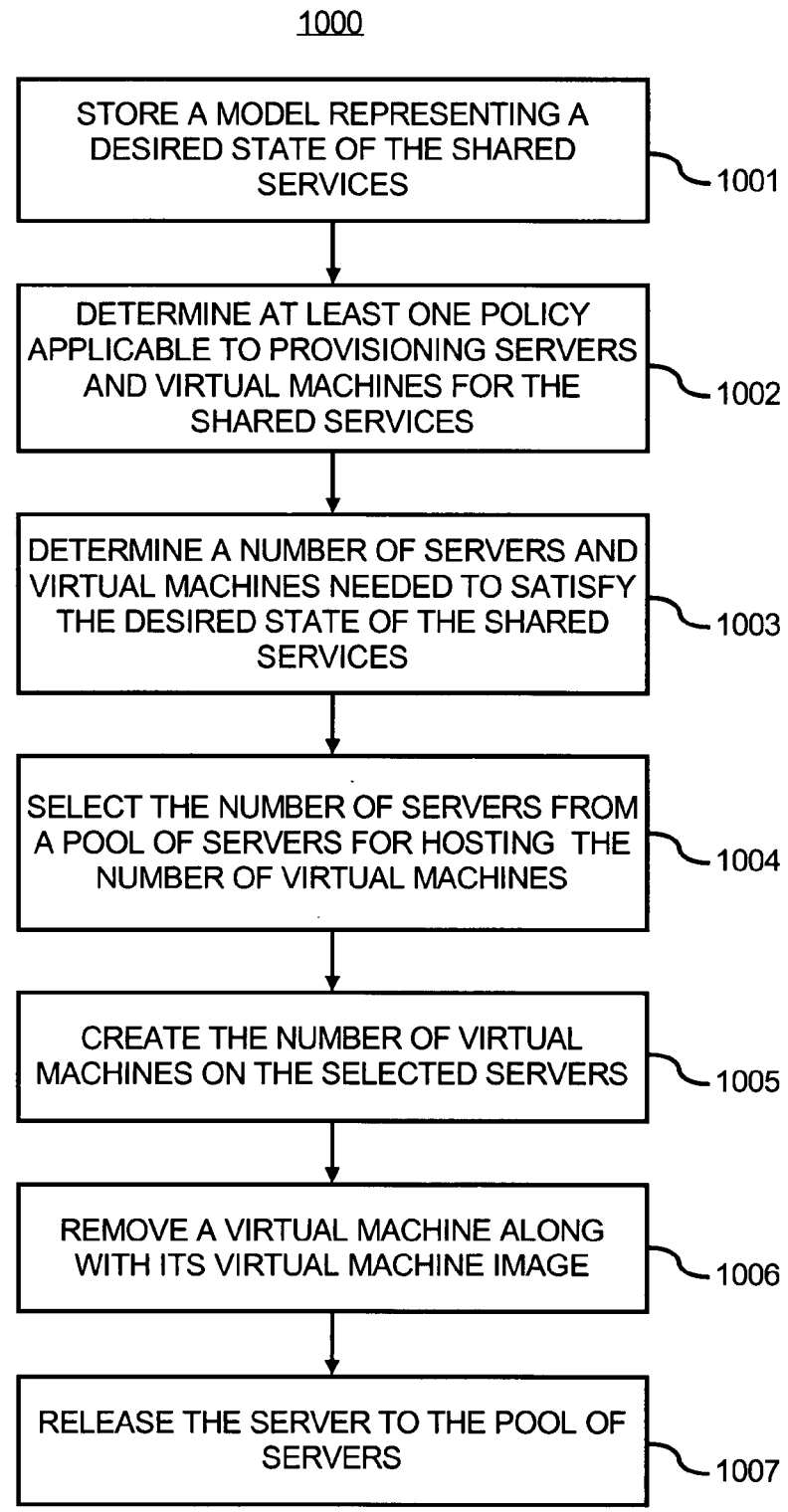
FIG. 10 illustrates a flow chart of a method for provisioning servers and virtual machines for shared resources, according to an embodiment.

FIG. 10 illustrates a method 1000 for automated provisioning of computing resources for shared services in a resource-on-demand system, according to an embodiment. The method 1000 is described with respect to one or more of FIGS. 1-8 by way of example and not limitation.

At step 1001, a model representing a desired state of the shared services is stored. For example, the data storage 150, shown in FIG. 1, stores a desired state model for a VDS.

At step 1002, at least one policy applicable to provisioning servers and virtual machines for the shared services is determined.

At step 1003, a number of servers and virtual machines needed to satisfy the desired state of the shared services are determined based on the policy and information from the model. For example, policies in the desired state model and/or in an allocation descriptor are determined and used to conform the observed state of the VDS to a desired state and to match resources with needed capacity. For example, if a policy is to maintain a predetermined number of unassigned desktops for a class of desktops, then a number of servers and a number of virtual machine instances are determined to provide the predetermined number of unassigned desktops.

At step 1004, the number of servers from a pool of servers are selected for provisioning to the shared services and for hosting at least one of the number of virtual machines. For example, the actuation tool 143 selects servers from the pool of servers 112 that are available and have the attributes of the server instances. The server allocator 701 shown in FIG. 7 invokes the image server 113 to distribute a boot image to each server. The servers are booted and are running a virtual machine environment. The virtual machine allocator 702 invokes the image server 113 to distribute a seed image to each server. If more than one class of virtual machine is to be created on a server, then a seed image for each class is distributed to the server. The seed image is copied for each instance of a virtual machine to be created on the server and the copies are executed to create virtual machines running on the server.

At step 1005, the number of virtual machines are created on the selected servers by executing the copies of the seed images. The virtual machines are unassigned until assigned to a user. The user session connector 703 assigns to the virtual machines to users as needed.

At step 1006, a virtual machine along with its copy of the seed image is removed from a server after a user logs off. For example, a user logs off a desktop. Then, the virtual machine providing the desktop is removed from the server along with the copy of the seed image.

At step 1007, the server may be released to the pool of resources and made available again for reallocation to desktops. For example, when the server is selected at step 1004, its status may be changed from available to unavailable. After removing the virtual machine, the server may be used for other virtual machines. Thus, its status is changed to available.

Figure 11:
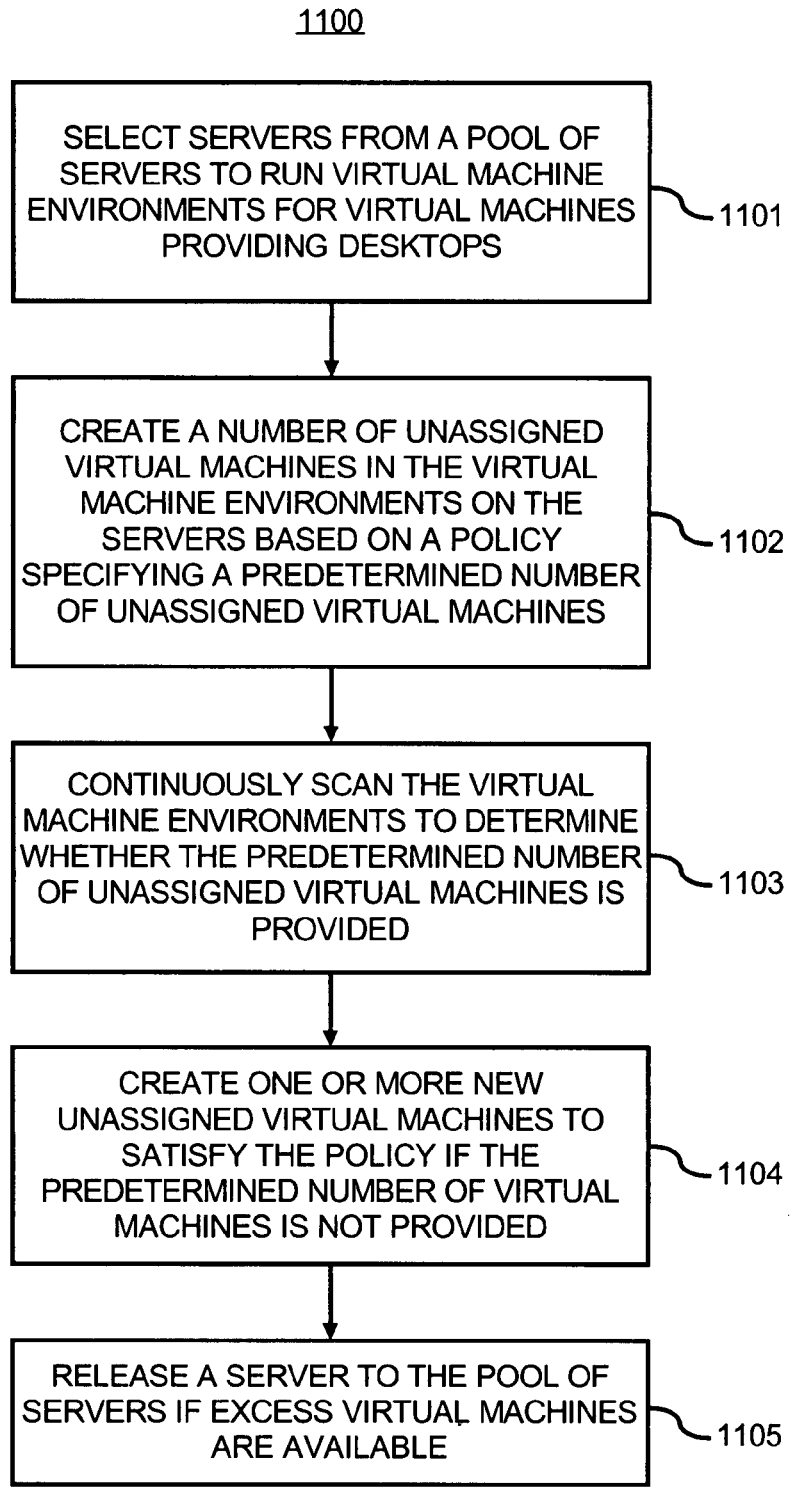
FIG. 11 illustrates a flow chart of a method for provisioning virtual machines, according to an embodiment.

FIG. 11 illustrates a method 1100 for provisioning virtual machines running desktops in a virtual desktop system, according to an embodiment. The method 1100 is described with respect to one or more of FIGS. 1-8 by way of example and not limitation.

At step 1101, servers from a pool of servers are selected to run virtual machine environments for virtual machines providing desktops in the virtual desktop system. For example, servers from the pool of servers 112 are selected based on attributes and virtual machine instances specified in the desired state model shown in FIG. 5.

At step 1102, a number of unassigned virtual machines in the virtual machine environments on the servers are created based on a policy specifying a predetermined number of unassigned virtual machines to be provided for a given period of time. For example, the desired state shown in FIG. 5 is generated because the policy requires that at least two unassigned desktops are required to be running. The policy may be applicable for a given period of time, such as between 9 AM and 6 PM. The policy may be specified as a threshold ratio of unassigned and assigned desktops. The desktops may be a predetermined class of desktops, such as standard desktops.

At step 1103, the virtual machine environments are continuously scanned to determine whether the predetermined number of unassigned virtual machines is provided. For example, the actuation tool 143 shown in FIGS. 1 and 7 determines when virtual machines are assigned, unassigned and removed. The scanning of virtual machines may be started when the first virtual machine is created and may continue as long as virtual machines are being provisioned for desktops.

At step 1104, one or more new unassigned virtual machines are created to satisfy the policy if the predetermined number of virtual machines is not provided. Virtual machines are removed when a user logs off a desktop. Removing a virtual machine from a server hosting the virtual machine changes a ratio of unassigned and assigned virtual machines currently running in the virtual machine environments. If the ratio of currently running unassigned and assigned virtual machines falls below a threshold ratio, then more virtual machines may be created. The decision to create more virtual machines may be based on additional information, such as past utilization of desktops.

At step 1105, a server is released to the pool of servers if excess virtual machines are available. For example, if no assigned virtual machines are found when scanning the virtual machine environments, one or more servers may be released to the pool of servers and shut down or repurposed.

The methods described above include many of the same steps. Also, the methods described above may be performed together or separately. If two or more of the methods are performed together and include the same steps, those steps may not be repeated.

Figure 12:
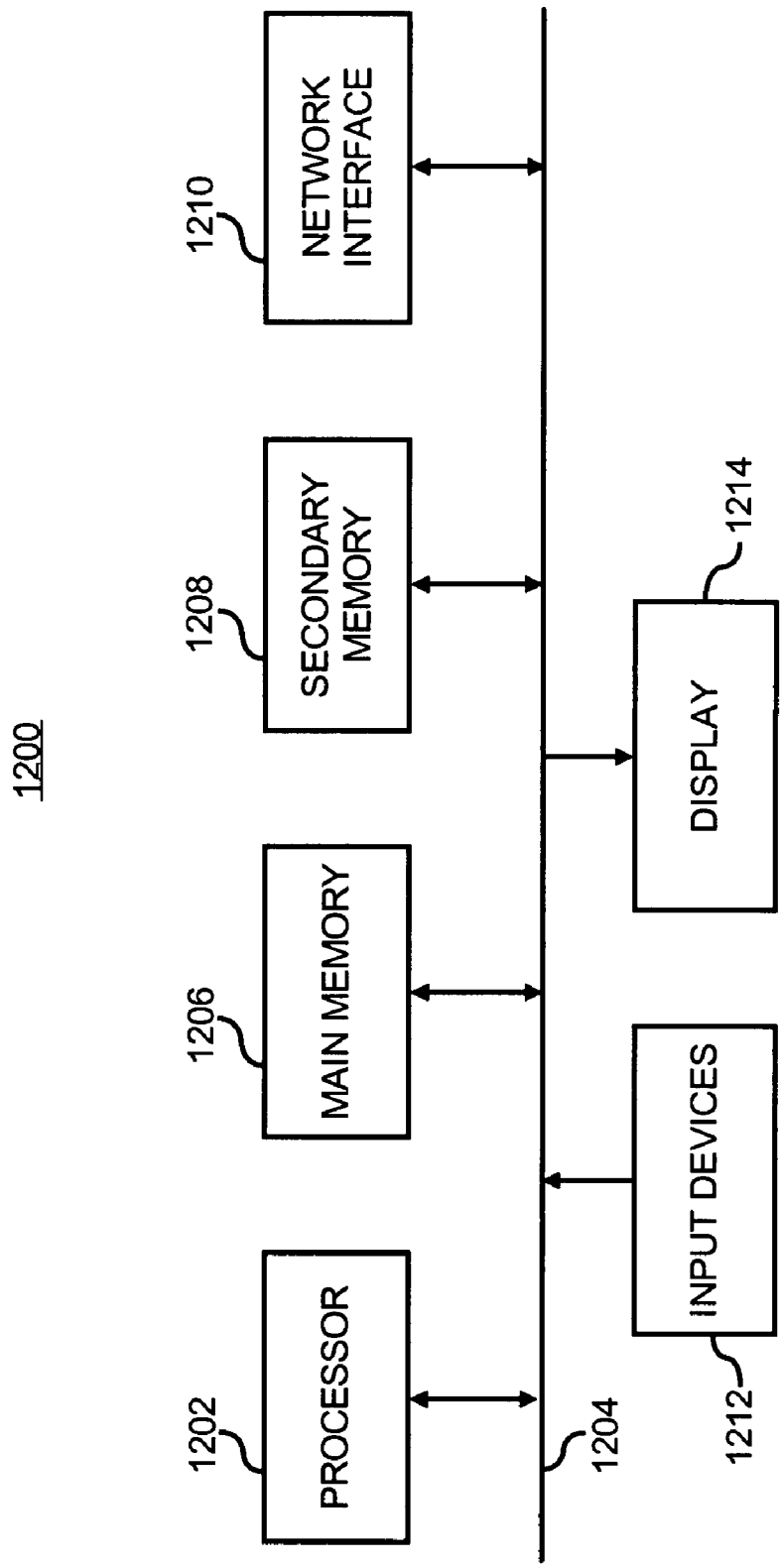
FIG. 12 illustrates a computer system, according to an embodiment.

FIG. 12 shows a schematic block diagram of a computer system 1200, according to an embodiment. The computer system 1200 may be used as a platform for the provisioning system 130 shown in FIG. 1.

The computer system 1200 includes one or more processors, such as processor 1202, providing an execution platform for executing software. Commands and data from the processor 1202 are communicated over a communication bus 1204. The computer system 1200 also includes a main memory 1206, such as a random access memory (RAM), where software may be resident during runtime, and a secondary memory 1208. The secondary memory 1208 includes, for example, a hard disk drive or other type of storage device. Other examples of the secondary memory 1208 include ROM (read only memory), EPROM (erasable, programmable ROM), EEPROM (electrically erasable, programmable ROM).

The computer system 1200 optionally includes user interfaces comprising one or more input devices 1212, such as a keyboard, a mouse, a stylus, and the like. The computer system 1200 also optionally includes a display 1214. A network interface 1212 is provided for communicating with other computer systems. It will be apparent to one of ordinary skill in the art that the computer system 1200 may include more or less features depending on the complexity of the system needed.

It will be apparent to one of ordinary skill in the art that FIG. 12 is meant to illustrate a generic computer system. Any type of computer system may be used. Furthermore, one or more components of the components of the computer system 1200 are optional, such as the display and input devices, and other types of components may be used or substituted as is known in the art.

One or more of the steps of the methods 900-1100 and other steps described herein may be implemented as software embedded or stored on a computer readable medium, such as the memory 1206, and executed by the processor 1202. The steps may be embodied by a computer program, which may exist in a variety of forms both active and inactive. For example, there may exist as software program(s) comprised of program instructions in source code, object code, executable code or other formats for performing some of the steps when executed, for example, by the processor 1202. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM, DVD or via Internet download. It is therefore to be understood that those functions enumerated herein may be performed by any electronic device capable of executing the above-described functions.

What is claimed is:

1. A method of automated provisioning of computing resources for shared services in a resource-on-demand system, the method comprising:

storing a model representing a desired state of the shared services including shared services resource requirements;

storing a model representing an observed state of the computing resources allocated to the shared services in the resource-on-demand system;

populating the model representing the observed state based on observations from a monitoring tool monitoring the computing resources;

determining, using a processor, at least one policy applicable to provisioning servers and virtual machines for the shared services;

determining a number of servers and virtual machines needed to satisfy the desired state of the shared services based on the at least one policy and information from the model;

selecting the number of servers from a pool of servers for provisioning to the shared services and for hosting the number of virtual machines;

comparing the observations from the monitoring tool from the model representing the observed state with the shared services resource requirements from the model representing the desired state of the shared services;

determining from the comparison that there is a difference between the observations and the shared services resource requirements; and adjusting, based on having determined the difference, at least one of the desired state in the model representing the desired state of the shared services and the number of servers from a pool of servers for provisioning to the shared services and for hosting the number of virtual machines.

2. The method of claim 1, further comprising:
distributing a boot image to each selected server; and
booting each server.

3. The method of claim 2, wherein the boot image on each server includes virtual machine host software that is started after the server is booted and creates a virtualization environment on the server for creating, starting and stopping a virtual machine on the server.

4. The method of claim 2, further comprising:
distributing a seed image to each server;
making a copy of the seed image for each virtual machine to be created; and
creating the number of virtual machines on the servers using the copied seed images.

5. The method of claim 4, wherein the seed image comprises applications and data.

6. The method of claim 4, wherein creating the number of virtual machines further comprises:
booting each virtual machine to create an unassigned virtual machine.

7. The method of claim 6, wherein the shared services comprises a virtual desktop system, the method comprising:
assigning at least one unassigned virtual machine to a desktop in the virtual desktop system.

8. The method of claim 7, wherein assigning at least one unassigned virtual machine to a desktop in the virtual desktop system further comprises:
receiving a user request for the desktop; and
assigning one of the unassigned virtual machines to the user to provide the desktop based on the at least one policy.

9. The method of claim 8, further comprising:
removing the copy of the seed image for the virtual machine assigned to the desktop from the server hosting the virtual machine for the desktop when a user logs off the desktop.

10. The method of claim 9, further comprising:
releasing the server previously hosting the virtual machine for the desktop to a pool of servers such that the server is operable to be selected to host another virtual machine.

11. The method of claim 10, further comprising:
shutting down the server.

12. The method of claim 10, further comprising:
repurposing the server by shutting down the server and reloading a new image on the server to run other software.

13. The method of claim 9, further comprising:
keeping the virtual machine operational so the server provides an unassigned desktop.

14. The method of claim 1, further comprising:
storing boot images including software needed to boot a server and create a virtual environment on the server; and
storing seed images including software for and to run in virtual machines; and
receiving patches including updates for at least one of the boot images and seed images; and
storing the patches such that the patches are operable to be loaded onto the servers for booting the servers and running the virtual machines.

15. The method of claim 1, wherein the at least one policy specifies a number of unassigned virtual machines that must be available for assigning to desktops in a virtual desktop system.

16. The method of claim 15, wherein the at least one policy specifies a number of unassigned virtual machines for each class of desktops that must be available for assigning to users to provide desktops in the class.

17. A method of provisioning virtual machines running desktops in a virtual desktop system, the method comprising:
selecting servers from a pool of servers to run virtual machine environments for virtual machines providing desktops in the virtual desktop system;
creating a number of unassigned virtual machines in the virtual machine environments on the servers based on a policy specifying a predetermined number of unassigned virtual machines to be provided for a given period of time, wherein the predetermined number of unassigned virtual machines is a threshold ratio of unassigned to assigned virtual machines required to be running in the virtual machine environments;
assigning an unassigned virtual machine to a user if a request for a desktop is received;
continuously scanning all virtual machine environments to determine whether the predetermined number of unassigned virtual machines are provided; and
creating one or more new unassigned virtual machines to satisfy the policy if the predetermined number of virtual machines are not provided.

18. The method of claim 17, further comprising:
determining when a user logs off any of the assigned virtual machines;
removing the virtual machine from the server hosting the virtual machine which changes a ratio of unassigned and assigned virtual machines currently running in the virtual machine environments; and
the creating one or more new unassigned virtual machines comprises creating one or more new unassigned virtual machines if the ratio of currently running unassigned and assigned virtual machines falls below the threshold ratio.

19. The method of claim 18, further comprising:
releasing the server previously hosting the removed virtual machine to a pool of servers if no assigned virtual machines are found when scanning the virtual machine environments.

20. The method of claim 18, further comprising:
determining whether to create new unassigned virtual machines or whether to release one or more of the servers to a pool of servers based on the ratio of currently unassigned and assigned virtual machines, the policy specifying the predetermined number of virtual machines, and past utilization of the virtual machines.

21. A software computing resource management tool stored on a non-transitory computer readable medium, the tool when executed is operable to perform a method comprising:

storing a model representing a desired state of a virtual desktop system;

selecting servers from a pool of servers to run virtual machines providing desktops in the virtual desktop system based on an available or unavailable status of each server in the pool of servers and based on a number of servers needed to satisfy the desired stated of the virtual desktop system, wherein the desired state of the virtual desktop system is determined from at least one policy and information from the model;

loading boot images on the selected servers, wherein the boot images are executed to boot the server and create virtual machine environments on the servers to run virtual machines;

loading seed images for the desktops on the servers; and creating unassigned desktops operable to be assigned to users requesting a desktop from virtual machine images created from the seed images on the servers based on a policy specifying a predetermined number of unassigned virtual machines to be provided for a given period of time, wherein the predetermined number of unassigned virtual machines is a threshold ratio of unassigned to assigned virtual machines required to be running in the virtual machine environments.

22. The software tool of claim 21, wherein the method further comprises:

receiving a user request for a desktop;

assigning one of the unassigned desktops for a desktop for the user; and creating a desktop session for the user providing the user with interaction with the desktop.

23. The software tool of claim 21, wherein selecting servers comprises:

determining a number of unassigned desktops needed to satisfy the desired state of the virtual desktop system based on the at least one policy; and determining a number of servers needed to run virtual machines based on the number of unassigned desktops needed to satisfy the desired state of the virtual desktop system; and selecting the number of servers from the pool of servers that have computer resource attributes specified by the at least one policy.

24. The method of claim 21, further comprising:

changing the status of the selected servers to unavailable when the servers are selected to run the virtual machines;

removing virtual machines from the selected servers when users log off from the desktops provided by the virtual machines; and changing the status of the selected servers to available such that the servers are operable to be provisioned for new desktops.

* * * * *

UNITED STATES PATENT AND TRADEMARK OFFICE
CERTIFICATE OF CORRECTION

PATENT NO. : 8,141,090 B1
APPLICATION NO. : 11/789411
DATED : March 20, 2012
INVENTOR(S) : Sven Graupner et al.

Page 1 of 1

It is certified that error appears in the above-identified patent and that said Letters Patent is hereby corrected as shown below:

In the Claims

In column 21, line 15, in Claim 21, delete "stated" and insert -- state --, therefor.

Signed and Sealed this
Twenty-eighth Day of May, 2013

Teresa Stanek Rea
*Acting Director of the United States Patent and Trademark Office*